United States Patent [19]
Harden et al.

[11] Patent Number: 5,376,047
[45] Date of Patent: Dec. 27, 1994

[54] CROP ENGAGING ELEMENT FOR AN AXIAL AGRICULTURAL COMBINE

[75] Inventors: Philip A. Harden, Colona; Mark F. Stickler, Silvis, both of Ill.

[73] Assignee: Deere & Company, Moline, Ill.

[21] Appl. No.: 53,054

[22] Filed: Apr. 26, 1993

[51] Int. Cl.5 .......................................... A01F 12/22
[52] U.S. Cl. .................................. 460/121; 460/122
[58] Field of Search ................ 460/121, 122, 71, 72, 460/73

[56] References Cited

U.S. PATENT DOCUMENTS

| | | | |
|---|---|---|---|
| 2,334,461 | 11/1943 | Welty | 460/72 |
| 4,348,855 | 9/1982 | DePauw et al. | 56/10.2 |
| 4,362,168 | 12/1982 | Hengen et al. | |
| 4,889,517 | 12/1989 | Strong et al. | 460/66 |
| 4,964,838 | 10/1990 | Cromheecke et al. | 460/66 |
| 5,125,871 | 6/1992 | Gorden | 460/69 |
| 5,152,717 | 10/1992 | Nelson et al. | 460/122 |

FOREIGN PATENT DOCUMENTS

| | | |
|---|---|---|
| 2615350 | 5/1988 | France. |
| 191399 | 4/1968 | Germany. |
| 0057380 | 1/1982 | Germany. |
| 2233019 | 12/1982 | Germany. |
| 0419786 | 7/1990 | Germany. |
| 1399602 | 7/1975 | United Kingdom. |
| 2015855 | 9/1979 | United Kingdom. |

*Primary Examiner*—Terry Lee Melius

[57] ABSTRACT

An improved crop engaging element for the threshing and separating sections of an axial rotor. The elements comprise a blade having a mounting plate that is mounted to the rotor drum and a sloped crop engaging plate extending upwardly from the mounting plate. The crop engaging plate is provided with a radially extending lip. The crop engaging plate is also provided with a slanted leading edge.

14 Claims, 3 Drawing Sheets

CROP ENGAGING ELEMENT FOR AN AXIAL AGRICULTURAL COMBINE

BACKGROUND OF THE INVENTION

1. Field of the Invention

The present invention is directed to a crop engaging element for an axial flow rotor which is used in both the threshing, separating and discharging sections of the rotor.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Axial flow combines have one or two large rotors arranged along the longitudinal axis of the machine for threshing and separating the harvested crop material. Traditionally different sections of the rotor have different crop engaging assemblies. For example, one proposed rotor has rasp bars and thinning rods in the threshing section and thinning rods in the separating section, See U.S. Pat. No. 4,964,838. In another proposed axial rotor, the threshing section is provided with rasp bars and the separating section is provided with transport bars, See U.S. Pat. No. 4,348,855.

It has also been proposed to use a number of identical blades in both the threshing and separating sections, See U.S. Pat. No. 4,362,168. In addition, the blades may be angled to the longitudinal axis of the rotor and be provided with a slanted leading edge.

SUMMARY

It is an object of the present invention to provide an improved crop engaging element that is used in the threshing and separating section of an axial flow rotor.

It is a feature of the present invention that the improved crop engaging element comprises a blade having a slanted leading edge and a radially extending lip.

The blades themselves comprise a sheet metal piece having a mounting plate and an upwardly sloped crop engagement surface having a radially extending lip. The blade forces the crop material outwardly from the rotor drum against the grates on the bottom of the rotor housing and the helical vanes on the top of the rotor housing. The radial lip has been found to be important in forcing the crop material outwardly in an abrupt manner.

DETAILED DESCRIPTION

Figure 1:
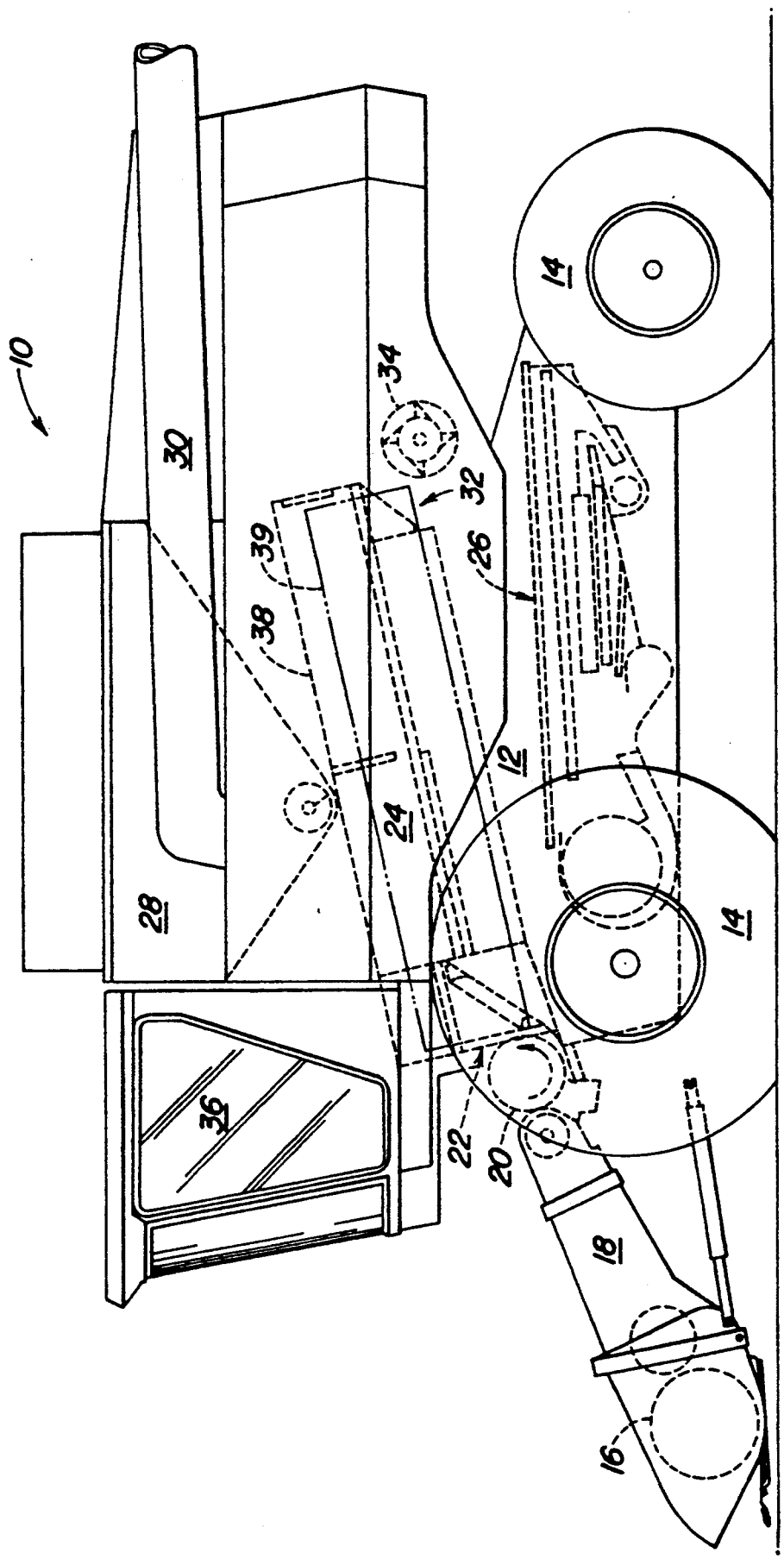
FIG. 1 is a semi-schematic side view of an axial flow agricultural combine.

FIG. 1 shows an agricultural combine 10 comprising a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit threshes and separates the harvested crop material. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. The operation of the combine is controlled from operator's cab 36.

The axial crop processing unit comprises a cylindrical rotor housing 38 and a rotor 39 located inside the housing 38. The rotor comprises a hollow cylindrical drum having twelve raised longitudinal channels 40 welded to its exterior. The channels are provided with a series of mounting holes 42 to which are mounted crop engaging elements 44.

Figure 2:
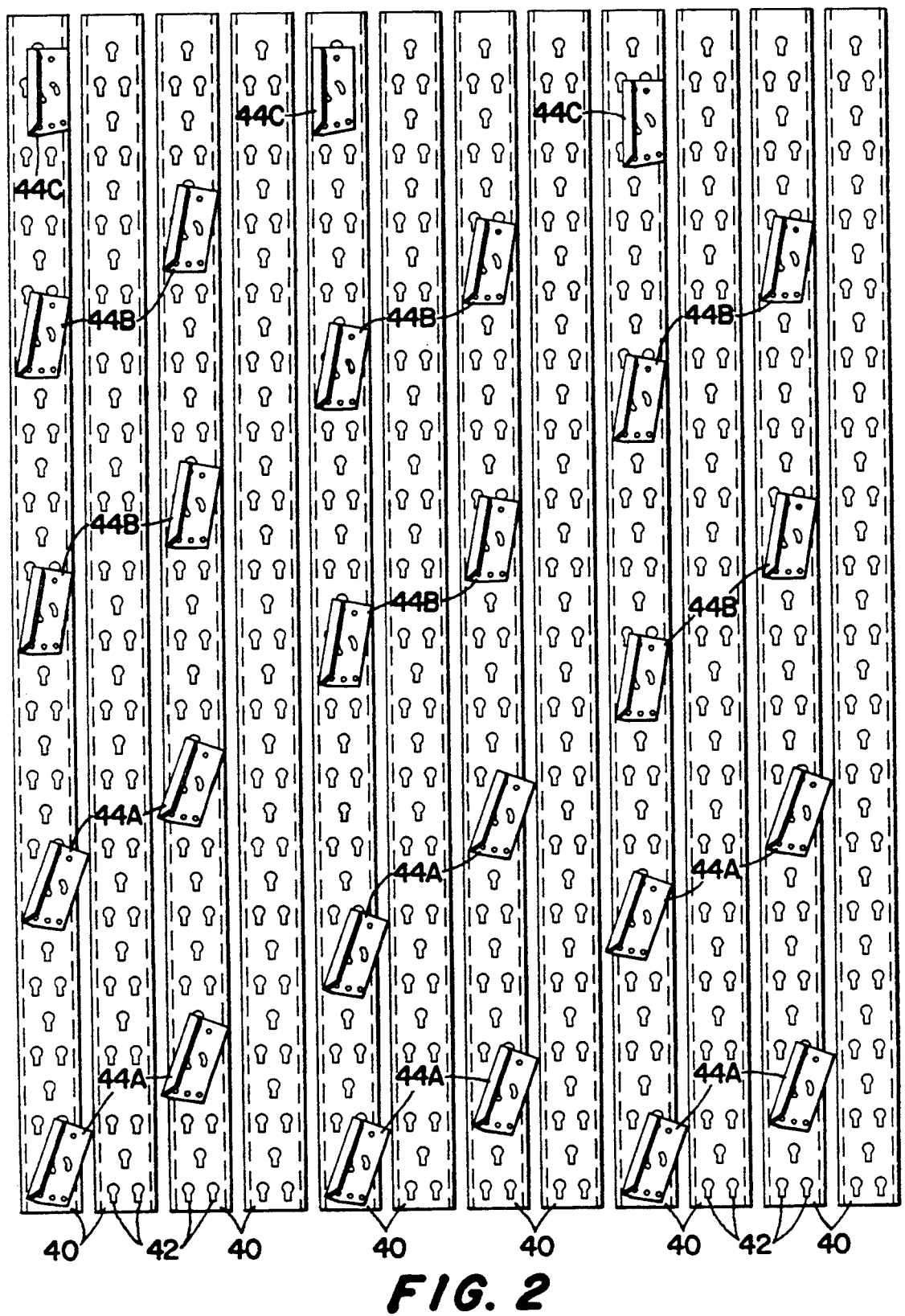
FIG. 2 is an unwrapped view of the rotor.
Figures 3, 4:
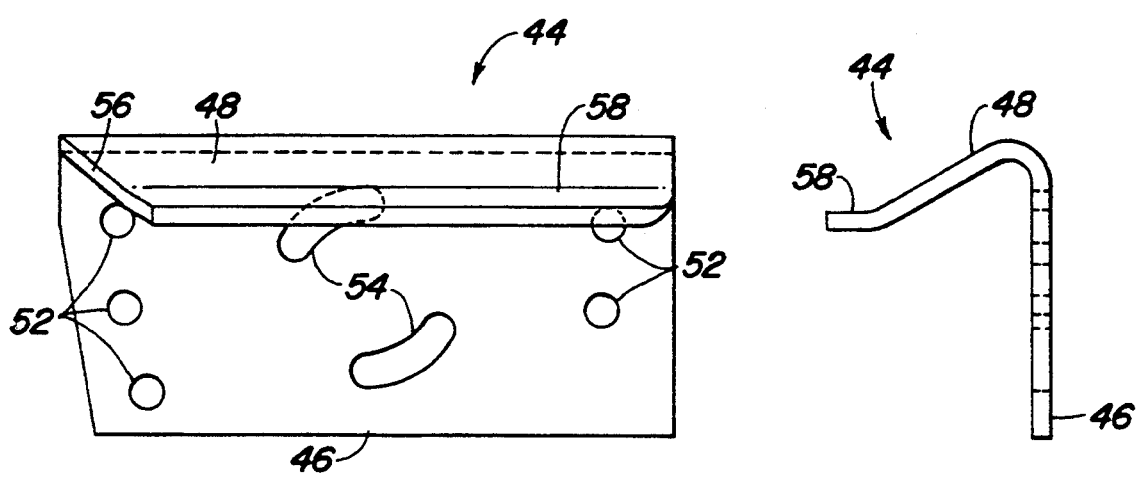
FIG. 3 is a top view of a crop engaging element of the present invention.
FIG. 4 is a side view of a crop engaging element of the present invention.

In the embodiment illustrated in FIG. 2, the bottom crop engagement elements 44a are arranged approximately 20° to the axis of rotation. These elements are located in the threshing section of the crop processing unit 24. The next group of crop engaging elements 44b are arranged 10° to the axis of rotation. These elements are located in the separating section of the crop processing unit. The last group of crop engaging elements 44c are located in the discharge section of the crop processing unit and they are arranged at 0° to the axis of rotation. Although the different groups of crop engaging elements have different designations 44a, 44b and 44c, they are identical except for their mounting location on the rotor. The illustrated crop engaging elements are angled for a counterclockwise rotating rotor.

It should be noted that different crops and different crop conditions may require different optimum blade angles from that illustrated in FIG. 2.

Each crop engaging element 44 is a blade comprising a mounting plate 46 and a sloped crop engaging plate 48. The mounting plate 46 is used to mount the crop engaging element to the longitudinal channels of the rotor. The mounting plate is provided with five mounting holes 52 and two semi-circular mounting slots 54. The mounting holes 52 are arranged so at least three holes are aligned with the mounting holes 42 located on the longitudinal channels when the crop engaging elements are at an angle of 10° and 20° to the axis of rotation. Two mounting holes 52 are aligned with the mounting holes 42 of the longitudinal channel when the crop engaging elements are at an angle of 0° to the axis of rotation. The mounting slots 54 are used for more extreme mounting configurations. The crop engaging elements are mounted to the channels by suitable bolts.

The sloped crop engaging plate 48 extends upwardly from the mounting plate at a sloped angle. The crop engaging plate forms an acute angle with the mounting plate. The crop engaging plate is provided with a sloped leading edge 56 and a radially extending lip 58. The radially extending lip is perpendicular to the mounting plate. The lip is used to drive crop material radially outward from the rotor into engagement with the helical vanes and the grates of the rotor housing.

The crop engaging elements of the present invention should not be limited by the above described embodiment, but should be limited solely by the claims that follow.

We claim:

1. An axial flow agricultural combine comprising:
   a supporting structure;
   ground engaging means extending from the supporting structure for transporting the supporting structure across a field;
   an axial rotor housing having a forward open inlet for receiving harvested crop material, grates are positioned along the housing through which threshed and separated grain is removed from the housing, and a rear open outlet through which non-grain material is removed from the housing;
   an axial rotor for threshing and separating a harvested crop, the rotor being housed in the housing, the rotor is provided with a rotor drum having crop engaging elements extending outwardly therefrom, the crop engaging elements comprise blades each having a mounting plate for mounting the blades to the rotor drum and a sloped crop engaging plate extending upward from the mounting plate, the sloped crop engaging plate is provided with a radially extending lip that is perpendicular to the mounting plate.

2. An axial agricultural combine as defined by claim 1 wherein the crop engaging plate of each blade is provided with a slanted leading edge.

3. An axial agricultural combine as defined by claim 2 wherein the rotor has a threshing section for threshing crop material, a separating section for separating crop material and a discharge section for discharging non-grain crop material, the rotor also having an axis of rotation, the blades are located in all three sections.

4. An axial agricultural combine as defined by claim 3 wherein the blades are arranged in the threshing section so that the crop engaging plate of each blade is approximately 20° to the axis of rotation.

5. An axial agricultural combine as defined by claim 4 wherein the blades are arranged in the separating section so that the crop engaging plate of each blade is approximately 10° to the axis of rotation.

6. An axial agricultural combine as defined by claim 5 wherein the blades are arranged in the discharging section so that the crop engaging plate of each blade is approximately 0° to the axis of rotation.

7. An axial agricultural combine as defined by claim 3 wherein the blades are arranged in the separating section so that the crop engaging plate of each blade is approximately 10° to the axis of rotation.

8. An axial agricultural combine as defined by claim 7 wherein the blades are arranged in the discharging section so that the crop engaging plate of each blade is approximately 0° to the axis of rotation.

9. An axial agricultural combine as defined by claim 3 wherein the blades are arranged in the discharging section so that the crop engaging plate of each blade is approximately 0° to the axis of rotation.

10. A crop engaging element for an axial flow agricultural combine, the element comprising:
    a mounting plate for mounting said crop engaging element to an axial rotor; and
    a sloped crop engaging plate extending upward from the mounting plate, the crop engaging plate being provided with a radially extending lip that is perpendicular to the mounting plate.

11. A crop engaging element as defined by claim 10 wherein the crop engaging plate of each blade is provided with a slanted leading edge.

12. A crop engaging element as defined by claim 11 wherein the sloped crop engaging plate forms an acute angle with the mounting plate.

13. A crop engaging element as defined by claim 12 wherein the mounting plate is provided with mounting holes.

14. A crop engaging element as defined by claim 13 wherein the mounting plate is provided with two semicircular mounting slots.

* * * * *